(12) United States Patent
Takahashi

(10) Patent No.: US 8,661,682 B2
(45) Date of Patent: Mar. 4, 2014

(54) RING MANUFACTURING METHOD, APPARATUS OF THE SAME AND RING

(75) Inventor: Masaki Takahashi, Tokyo (JP)

(73) Assignee: Mokumeganeya Co., Ltd., Tokyo (JP)

(*) Notice: Subject to any disclaimer, the term of this patent is extended or adjusted under 35 U.S.C. 154(b) by 156 days.

(21) Appl. No.: 13/247,272

(22) Filed: Sep. 28, 2011

(65) Prior Publication Data

US 2012/0079720 A1 Apr. 5, 2012

(30) Foreign Application Priority Data

Oct. 4, 2010 (JP) ................................. 2010-224685

(51) Int. Cl.
A44C 27/00 (2006.01)
(52) U.S. Cl.
USPC .................... 29/896.412; 29/896.41
(58) Field of Classification Search
USPC ............... 29/896.41, 896.412, 33 R; 72/340
See application file for complete search history.

(56) References Cited

U.S. PATENT DOCUMENTS

| | | | | |
|---|---|---|---|---|
| 7,942,308 B2* | 5/2011 | Midgett | ..................... | 228/173.6 |
| 2006/0261135 A1 | 11/2006 | Midgett | | |
| 2012/0107561 A1* | 5/2012 | Hirama et al. | ................ | 428/151 |
| 2013/0004789 A1* | 1/2013 | Takahashi | ..................... | 428/601 |

FOREIGN PATENT DOCUMENTS

| | | |
|---|---|---|
| DE | 102009010149 A1 | 9/2010 |
| JP | 2009-196299 A | 9/2009 |
| JP | 3158531 U | 3/2010 |

OTHER PUBLICATIONS

European Search Report for EP Patent App No. 11183798.5 (Feb. 8, 2012).
International Search Report for PCT Patent App. No. PCT/JP2011/005600 (Dec. 13, 2011).

* cited by examiner

*Primary Examiner* — Alexander P Taousakis
(74) *Attorney, Agent, or Firm* — Cermak Nakajima LLP; Tomoko Nakajima (57) ABSTRACT

A ring manufacturing method of the present invention includes: a laminating step laminating a plurality of metal plates; a junction step jointing the plurality of metal plates by heating and giving pressure; a twisting step heating and twisting the plurality of metal plates after the junction step, an angle stick processing step performing twist processing to the plurality of metal plates to make angle stick shape, a slit formation step forming two longitudinal slits in angle stick component, a ring formation step opening the slits from inside thereof to make two ring components, and a cutting step cutting and separating the two ring components into two rings.

8 Claims, 8 Drawing Sheets

RING MANUFACTURING METHOD, APPARATUS OF THE SAME AND RING

This application claims priority under 35 U.S.C. §119 to Japanese Patent Application No. 2010-224685, filed Oct. 4, 2010, which is incorporated in its entirety by reference.

FIELD OF INVENTION

This invention relates to a ring manufacture method which forms two rings by processing two obtained laminating of two or more metal plates which the quality of the materials differ, a apparatus of the same, and a ring manufactured buy the ring manufacture method.

BACKGROUND

Mokumegane is a special metal working technology which Japan is proud of in the world. The special processing process exceeds the frame of mere technology, and reaches even an ideological and mental domain called the dialog of a material and a producer.

After carrying out the lamination and joint of the metal plates with which colors differ and twist processing, the surface is carved by chisel or the trill-like tool, then "mokume" patterns are formed on the surface by forging into palate with hammer.

By the way, when manufacturing a ring, a pendant, etc. of a pair by the mokumegane technique, there is a request for forming the feature pattern common to a pair rings and a pendant, etc.

In a prior art, the manufacturing process of the metal plate used for pair rings or a pendant is not managed systematically, and each craftsman manufactures based on experience. Therefore, there is a problem that it is difficult to increase the number of manufacturers and the number of produces.

SUMMARY OF THE INVENTION

This invention is made in view of this situation, and the purpose of the present invention is to provide a metal object manufacture method which can manage systematically a manufacture processing when manufacturing a plurality of metal object on which common features pattern from a original metal plate occurs, an apparatus of the same, and a metal object manufactured by the method.

A ring manufacturing method of the present invention comprising:

a laminating step laminating a plurality of metal plates; a junction step jointing the plurality of metal plates by heating and giving pressure; a twisting step heating and twisting the plurality of metal plates after the junction step;

an angle stick processing step performing twist processing to the plurality of metal plates to make angle stick shape; a slit formation step forming two longitudinal slits in angle stick component; a ring formation step opening the slits from inside thereof to make two ring components; and a cutting step cutting and separating the two ring components into two rings.

Preferable the ring manufacturing method of the present invention further comprising a hole formation step forming through-holes nearby both end of the angle stick component, wherein the slit formation step forms the slit from the through-hole to the center of the angle stick component.

Preferable the ring manufacturing method of the present invention, further comprising: an interval determination step indicating an interval of feature pattern repeatedly occurred on the ring component; and a time of twists determination step determining the time of the twists in the twisting step based on sum of length of round direction of the two ring component and the interval indicated in the interval determination step, wherein the twisting step heats and twists the plurality of metal plates after the junction step so that the time of the twists determined in the time of twists determination step of reversion occurs.

Preferable the ring manufacturing method of the present invention wherein the cutting step cuts and separates the two ring components into two rings so that a joint before the cutting step occurs as convex parts in the two rings after the cutting step.

Preferable the ring manufacturing method of the present invention wherein the slit formation step forms the slit by rubbing the angle stick with a threadlike saw in the through-holes, and the ring formation step inserts an iron core into the slit and swat to form the ring after opening the slit using graver.

Preferable the ring manufacturing method of the present invention wherein the junction step determines a pressurize temperature based on a thermal expansion coefficient of stainless steel to achieve prescribed pressure by pressurizing the laminated plurality of metal plates from both sides by stainless steel component.

A ring manufacturing apparatus comprising: a laminator laminating a plurality of metal plates; a jointer jointing the plurality of metal plates by heating and giving pressure; a twister heating and twisting the plurality of metal plates after the junction step; an angle stick processor performing twist processing to the plurality of metal plates to make angle stick shape; a slit former forming two longitudinal slits in angle stick component; a ring former opening the slits from inside thereof to make two ring components; and a cutter cutting and separating the two ring components into two rings.

A ring manufactured by a method comprising: a laminating step laminating a plurality of metal plates; a junction step jointing the plurality of metal plates by heating and giving pressure; a twisting step heating and twisting the plurality of metal plates after the junction step; an angle stick processing step performing twist processing to the plurality of metal plates to make angle stick shape; a slit formation step forming two longitudinal slits in angle stick component; a ring formation step opening the slits from inside thereof to make two ring components; and a cutting step cutting and separating the two ring components into two rings.

BRIEF DESCRIPTION OF THE DRAWINGS

FIG. 7 is a view for explaining the step of the Step ST20 shown in FIG. 3.

DETAILED DESCRIPTION OF THE INVENTION

Figure 1:
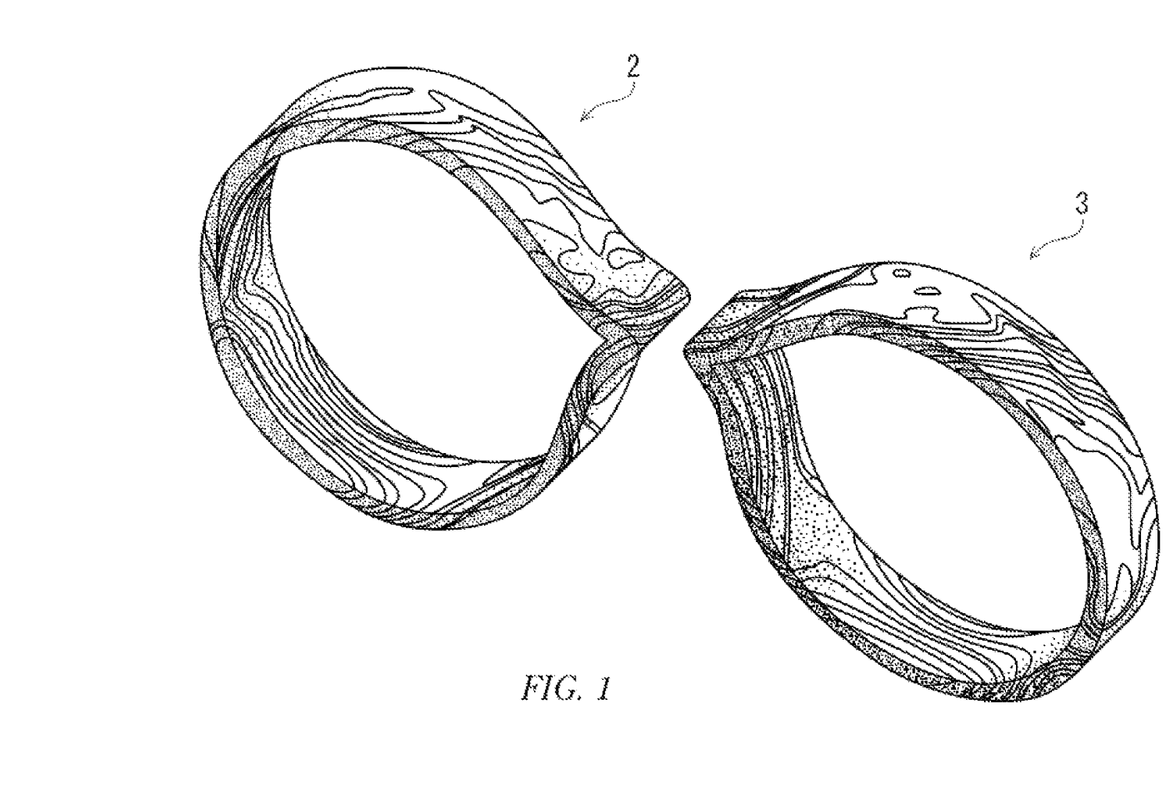
FIG. 1 is a perspective view of a ring for male and a ring for female manufactured in the present embodiment of the present invention.

In the present embodiment explains that the case where a ring for male 2 and a ring for female 3 having the same feature part are manufactured by mokumegane technology, as shown in FIG. 1.

In the present embodiment, the ring for male 2 and the ring for female 3 are manufactured from a single metal plate manufactured by mokumegane technology.

For example, from examination of the surface of the metal plate 14, a domain used as the ring for male and a domain used as the ring for female are formed in order in a single body. All parts are obtained by cutting boundary position of the domains.

Figure 2:
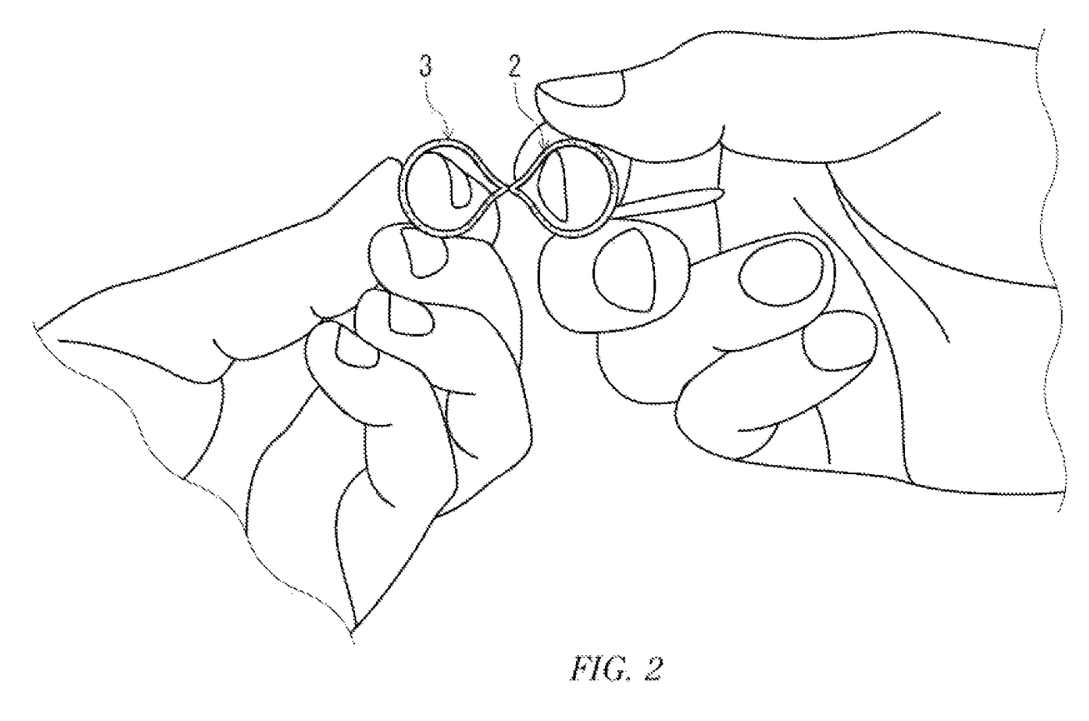
FIG. 2 is a concept view of a ring for male and a ring for female manufactured in the present embodiment of the present invention.

In the present embodiment, for example as shown in FIG. 2, convexity junction of the ring for male and the ring for female can be visually characterize integrally formed.

Hereafter, each step will be explained.

Figure 3:
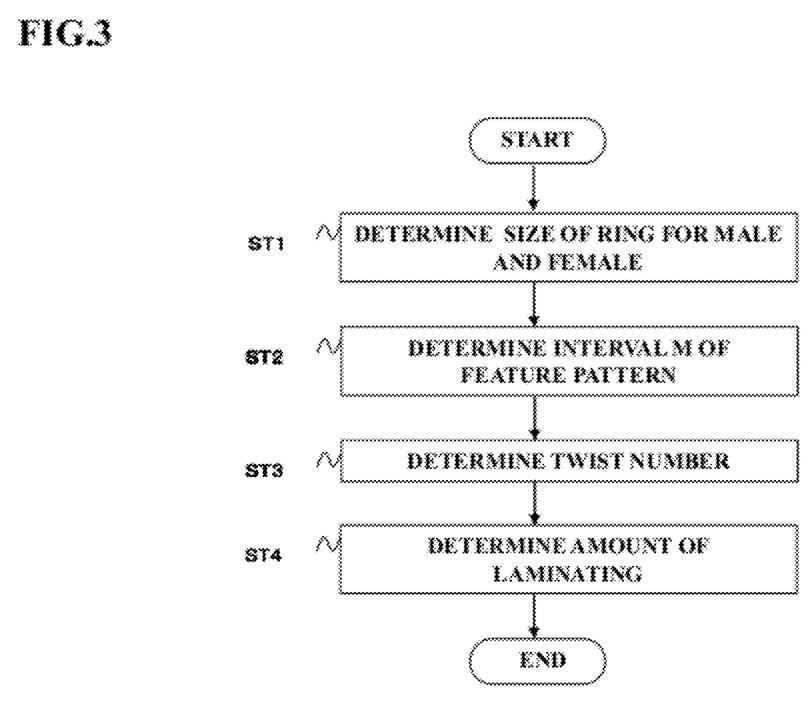
FIG. 3 is a flowchart for explain procedures for determining parameters for manufacturing a ring for male and a ring for female.

Step ST1:

A size (length) $K1$ of the direction of the circumference of the ring for males, a size $K2$ of the ring for female, a width $D12$ and a thickness $E12$ finally obtained are determined or specified according to directions from a user.

Step ST2:

Interval M of a feature pattern in a longitudinal direction is determined. The feature pattern is repeatedly occurred by twist on the ring for male and the ring for female finally obtained. The interval M is determined by a design and the request from a customer, for example.

Moreover, the main position of the surface of a male ring and the main position of the surface of a female ring on a square pole (rod) before cutting are determined.

Step ST3:

"W" is a length which is converted into a length of an end portion at the time of the twits which is omitted as an unnecessary portion and which has a section ($D12 \times E12$) of the final ring. That is, "W" is a length obtained by performing division of the volume of the end concerned by a section ($D12 \times E12$).

And the number of times V of a twist is computed by the following formula (1).

(Formula 1)

$$V = \{(K1+K2)-W\}/S \quad (1)$$

Furthermore, size S mentioned above might determined to occur same feature pattern (for example, parts of the lamination) made by twisting process in the center of the surface of a ring for male and a ring for female which are finally obtained, Feature patterns and the distance M are determined by the way to laminate two or more metal plates, for example a variety of the metal and thickness. The number of times of twist is determined based on this information.

A ratio of the distance L1 of a longitudinal direction of the pattern which specifically comprises a lamination portion for forming the feature pattern, and a distance L2 of the pattern which comprises a non-laminating portion is the same as the aspect ratio of the section of the angle stick component before the twist process. Moreover, the number and the distance m of the feature pattern are determined by the number of times of twist.

The number of times of the twist is determined based on the information so that the common pattern C is formed on a center position of the surface of the specified ring for male, a center position of the surface of the specified ring for female.

In addition, as shown in FIG. 1, the interval of Pattern C is set to L.

Step ST3:

The total capacity of the ring for males, the ring for female manufactured form the size of step ST1 and ST3, is determined, and the total capacity (gross weight) Z of the plates laminated based on it is determined as following(2).

(Formula 2)

$$Z = (K1+K2) \times D12 \times E12 + W \times D12 \times E12 \quad (2)$$

By determining the number of times of twist in the procedure shown in FIG. 1, the feature pattern finally independently formed in the rings can made the same among any size of rings. Consequently it can avoid that different image is obtained due to the change of feature pattern caused by the difference of the size of the rings.

Further, the common feature pattern can be occurred correctly on a metal plate at the position where used as the ring for males, the ring for female.

Below the step which manufactures the ring for males, the ring for female based on various kinds of parameters determined in the procedure shown in FIG. 1 will be explained.

Figure 4:
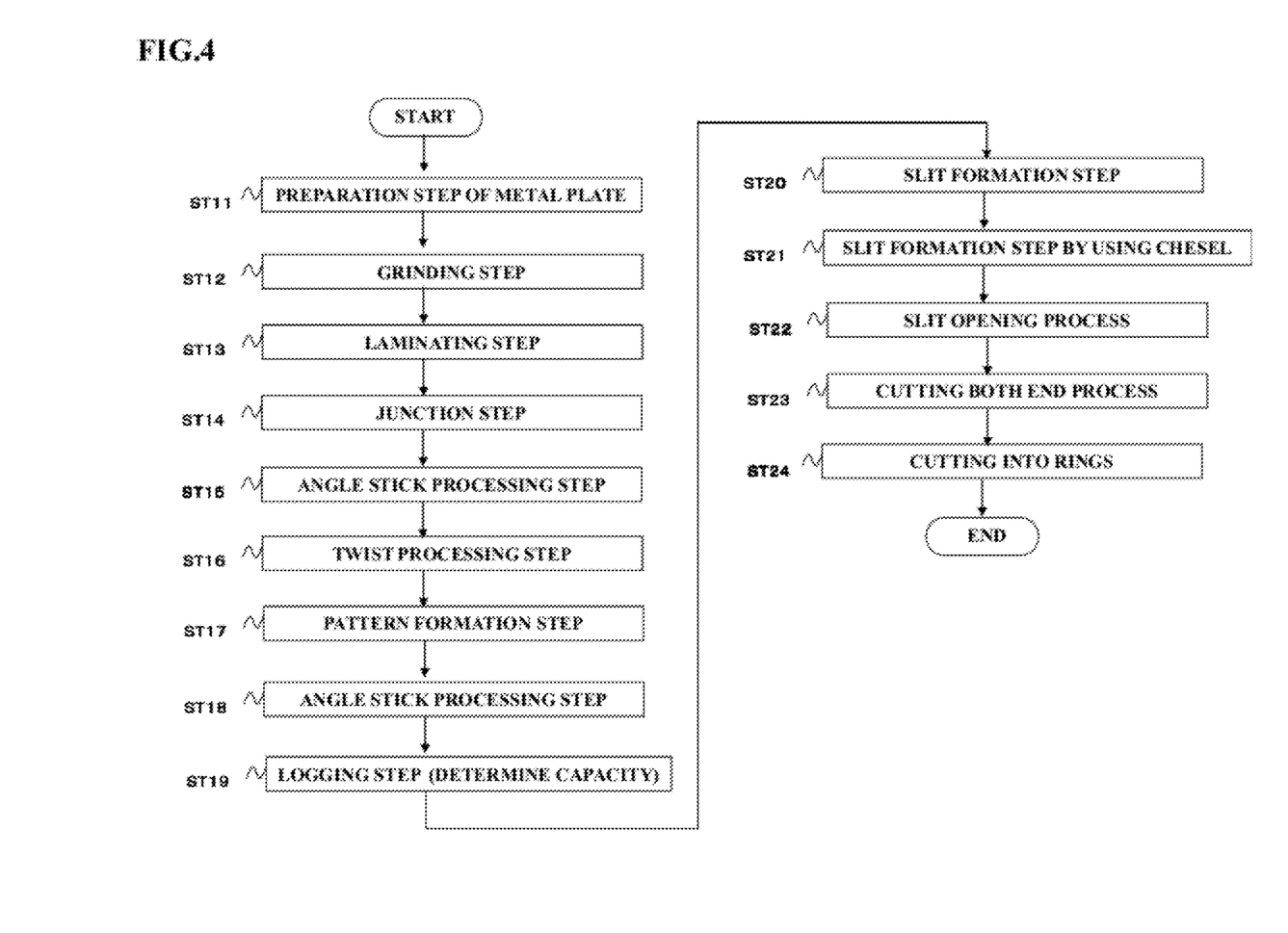
FIG. 4 is a view for explaining manufacturing process of the ring for male and the ring for female of the present embodiment of the present invention.

FIG. 4 is a figure for explaining a manufacturing step for the ring for male and the ring for female of the embodiment of the present invention.

All or a part of the following steps are performed with a machine or hands.

[Preparation Step of a Metal Plate (Step ST11)]

Two or more metal plates with which the quality of the materials differs are prepared.

As the material of a metal plate, platinum (Pt), gold (Au), silver (Ag), copper (Cu), brass, titanium (Ti), iron (Fe), nickel (Ni), stainless steel, tantalum (Ta), or these mixtures are used.

Two or more metal plates 11 comprise the quality of the material different, respectively, and character recognized visually, such as a color and a degree of gloss, differs. In addition, there should just be at least two kinds of metal plates 11 which the quality of the materials differ. Moreover, the same quality of the material may be used for the two or more metal plates among two or more metal plates 11.

[Step Before Lamination (Step ST12)]

Next, two or more metal plates 11 are ground as processing before junction using sandpapers No. 600, No. 800, No. 1000, No. 1200, No. 1500, etc. Then, charcoal grinding is used together and the surface is finished uniformly carefully.

[Laminating Step (Step ST13)]

Figure 5:
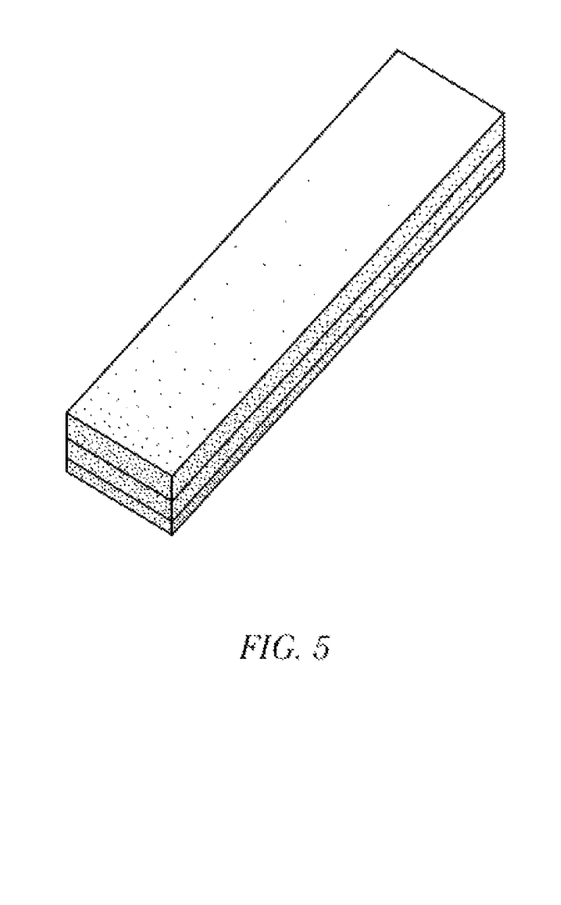
FIG. 5 is a view for explaining a state after the process of the Step ST13 shown in FIG. 3.

Next, as shown in FIG. 5, a multilayer metal object in which a two or more metal plates are laminated by laminating two or more metal plates and joining metal plates is formed. The multilayer metal object is an example of two or more metal plates of the present invention. At this time, the amount of laminating is determined based on the total capacity (gross weight) Z computed at Step ST4 shown in FIG. 3

Here, as order of laminating, it is determined in consideration of a final design (feature pattern)

[Junction Step (Step ST14)]

Junction of metal plates is performed by attaching the metal plates and giving pressure in a way in which the plastic deformation of the metal plate does not occurred as possible in the temperature conditions below the melting point of the metal plate. This is diffusion junction joined using diffusion of the atom produced between the junction sides of metal plates.

The conditions at the time of performing diffusion junction are as follows. Namely, it carries out by heating and pressurizing between 500 and 1200 degrees C. and between 200 and 500 kgf/cm2. In addition, junction of the metal plates is performed using wax.

At this time, laminated two or more metal plates are pressurize on both sides by stainless steel component. The pressurize temperature is determined based on thermal expansion coefficient of stainless steel to achieve prescribed pressure.

Diffusion combination will be explained.

When approaching and pressurizing the surfaces of metals to the grade which attains to an atomic level mutually, a metallic bond will start. It is supposed that it is possible to join by sticking two metals in a principle.

In the present embodiment, the metals having different color are combined in the state of solid phase by using the means of heating and pressurization based on the principle of this diffusion combination. In short, metal is not melted and it is made to join together in the state of a solid.

[Angle Stick Processing Step (Step ST15)]

Next, after inspecting details and removing imperfect portion of the lamination, for example, it is extended to the angle stick shape of 4.8 to 6.0×4.8 to 6.0 mm of sections using a roller.

In the present embodiment, the rate of extended in a lengthwise direction and a transverse direction adjustable by performing rolling processing to a plate with a roller. The angle stick is presumed on the basis of the monotonous volume of the result, and a balance suitable for performing twist processing is selected.

Thus, the angle stick processing is performed before a twist processing step because the ratio of the distance L1 of the direction of a longitudinal direction of the pattern which comprises a lamination portion of the metal angle stick and the distance L2 of the pattern which comprises a non-laminating portion are determined by the aspect ratio of the angle stick component after processing.

That is, the ratio with the distance L1 and L2 of metal angle stick, i.e., a design, can be adjusted by performing angle stick processing before twist processing.

[Twist Processing Step (Step ST16)]

Next, twist processing performs two or more reversion of face side and reverse side.

Heating and annealing are repeated and twist processing is given little by little while taking care the lamination order so that two or more reversions occurs in the angle stick after forge fabrication. At this time, the twist process while heating, a cooling process, and an annealing process are repeated successively.

In the present embodiment, twist processing of the number of times V determined at step ST3 of FIG. 3 is performed. Thereby, regardless of the size of a ring, the feature pattern finally independently formed on a ring can be made the same. Therefore it can avoid that image will be different because of a chance of the feature pattern due to the difference of the ring size.

Moreover, the common pattern C occurs on the main position of the surface of the male ring 2 and the main position of the surface of the female ring 3 before cutting mentioned later.

[Pattern Formation Step (Step ST17)]

Patterns are formed on twist processed part in Step ST16. Formation of the patterns is performed by carving using a chisel or a drill-like tool.

[Angle Stick Processing Step (Step ST18)]

Next, the component which passed through the pattern formation step is processed with extend processing by using roller to the angle stick shape.

In the present embodiment, the shape of section is made smaller than the component obtained by step ST15 in order to adjust so that an actual finish size may be suited.

Further a target of pattern formation can be made a plane by processing to the angle stick shape before pattern formation, and it becomes easy to form a pattern.

[Logging Step (Step ST18)]

Figure 6A:
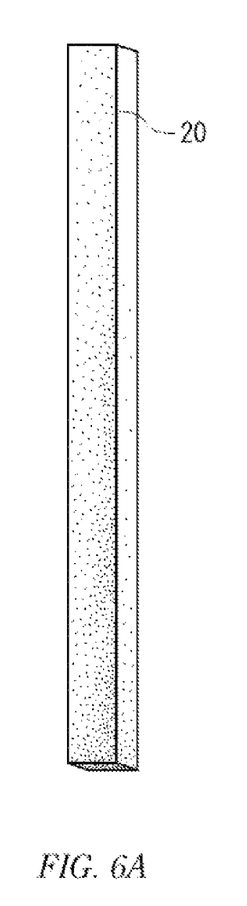
FIG. 6A is a view for explaining a state after the process of the Step ST20 shown in FIG. 3.

Next, as shown in FIG. 6A, only capacity required for formation of rings is logged from the angle stick 20 obtained by step ST18.

The capacity for logging should be determined by step ST4 of FIG. 3.

In the present embodiment the angle stick whose cross-section area is clear is obtained in the step ST18. Therefore the length for logging can be easily determined based on the capacity determined by step ST4, and the cross-section area of an angle stick component.

[Slit Formation Step (Step ST20)]

As shown in FIG. 6A, Two longitudinally extending slits are formed in an angle stick component 20 logged from Step ST19.

Concretely, as shown in FIG. 7, through-holes 22 and 24 are formed the both end of an angle stick component.

Afterward, slit 23 and 25 are formed by to thread through-holes 22 and 24 with a saw of shape of filament then move and rub a saw of shape of filament then along longitudinal direction toward center of an angle stick component 20.

[Slit Formation Step by Using Chisel (Step ST21)]

Figure 6B:
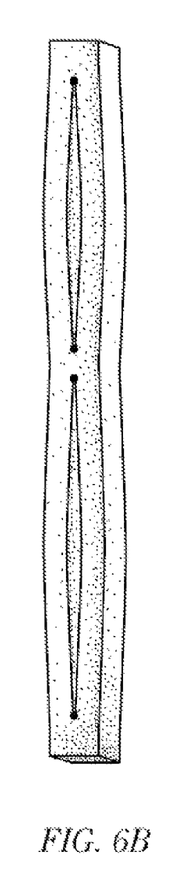
FIG. 6B is a view for explaining a state after the process of the Step ST21 shown in FIG. 3.

As shows in FIG. 6B, expand an aperture of the slits 23 and 25 formed in Step ST20 by using chisel.

Figure 8A:
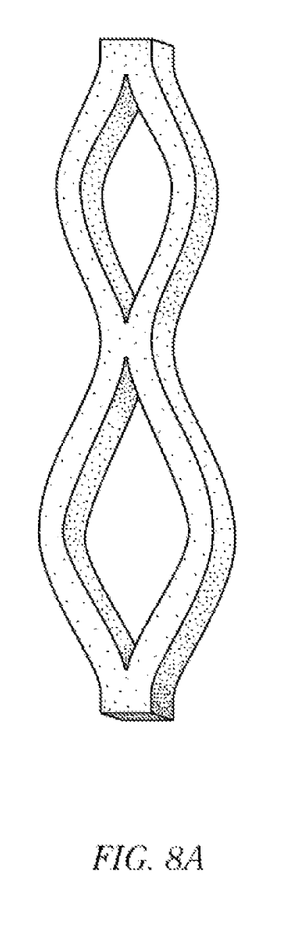
FIG. 8A is a view for explaining a state after the process of the Step ST22 shown in FIG. 3.

For example, as shows in FIG. 8A, an aperture is expanded up to the size that an iron core to fit in.

[Slit Opening Process (Step ST22)]

Figure 8B:
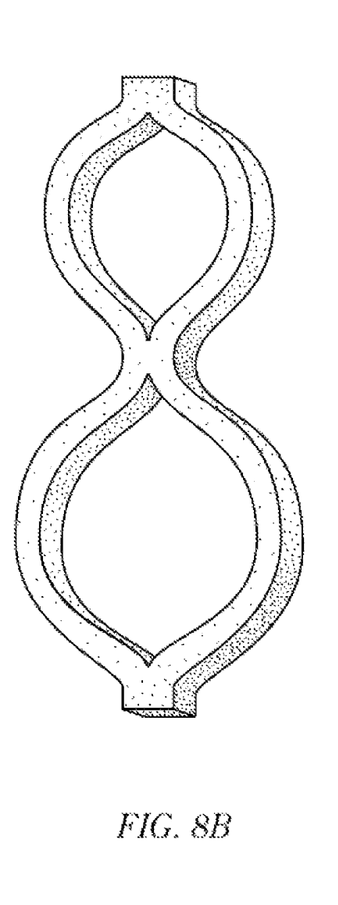
FIG. 8B is a view for explaining a state after the process of the Step ST22 shown in FIG. 3.
Figure 9A:
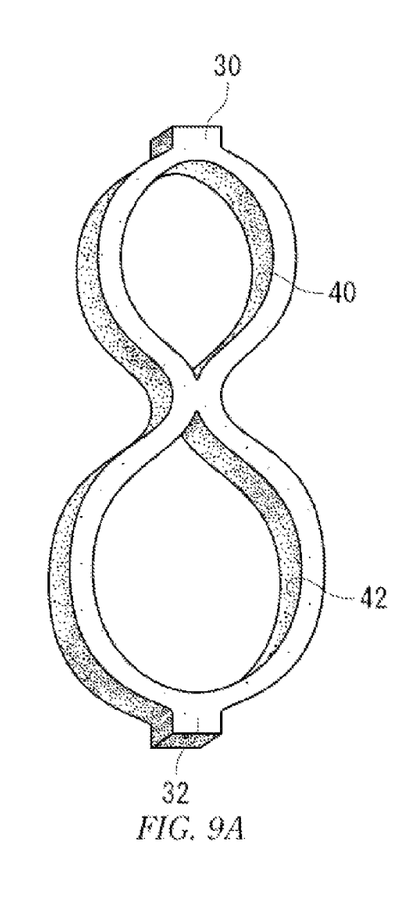
FIG. 9A is a view for explaining a state after the process of the Step ST22 shown in FIG. 3.

An iron core is put in the slit formed in Step ST21, then clang with a hummer in order to make a slit bigger, for example as shown in FIG. 8B and FIG. 9A.

[Cutting the Both End Process (Step ST23)]

As shown in FIG. 9, the both end 30 and 32 are cut.

[Cutting into Rings (Step ST24)]

As shown in FIG. 9A, joint of the ring 40 and ring 42 is cut to create two rings.

At this point, two rings are obtained by cutting the joint of two rings as convex.

Figure 9B:
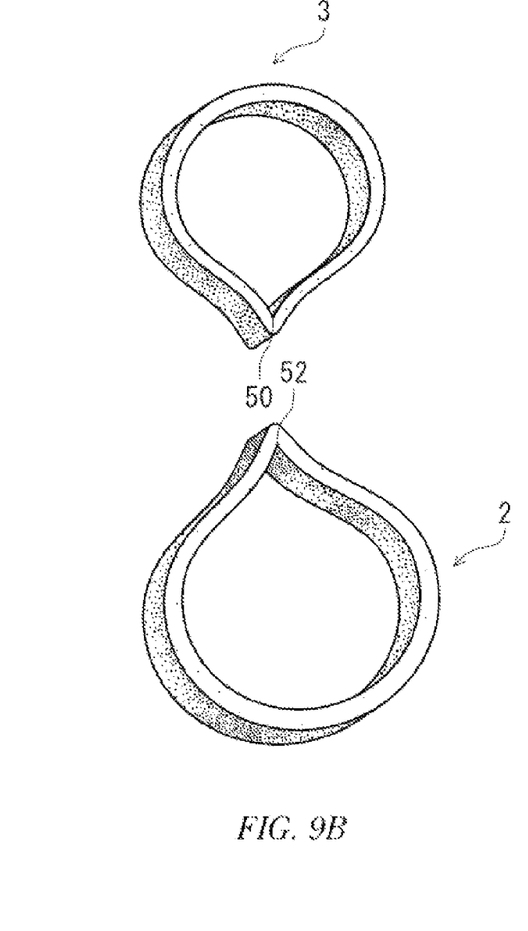
FIG. 9B is a perspective view of a ring for male and a ring for female manufactured in the present embodiment of the present invention.

Two rings obtained from cutting is further processed, as shown in FIG. 9B, the ring for males and the ring for female are obtained.

Configuration of convex parts 50 and 52 reminds image of, for example as shown in FIG. 2, when approximate tip of each parts.

As explained above, the manufacturing step of the ring 2 for males, the ring 3 for females are systematically managed by manufacturing a metal plate 14 in the procedure mentioned above in the present embodiment.

Therefore, regardless the differences of the ring size, it can make the feature pattern finally formed on the ring same. It can avoid that different image occurs by a change of the feature pattern originated in a difference of the sizes.

Moreover, there are high probability of the ring for male 2 and the ring for female 3 with the same feature pattern C in the appropriate position are manufactured, it can reduce the number of defective products.

Furthermore, it is easy to increase the number of manufacturer and product can be manufactured.

Moreover, in the present embodiment, rings are made by forming through-holes by expanding slits, not welded the both end of the metal plate. Therefore, there is no discontinuity of the design and can form a continuous design throughout the entire circumference of the ring.

In addition, convex parts 50 and 52 with consecutive design are formed in the ring for male 2 and the ring for female 3, which gives image of the bond.

In the present embodiment, as explained in Step ST20, through-holes 22 and 24 are formed nearby each of the both ends of an angle stick component 20, and through-hole is not formed side of the joint. As for this, around the both ends are hit in step 22 therefore through-holes are scarcely appear.

Convex parts 50 and 52 have to be hold if through-hole is formed side of the joint, thus through-hole remains.

In the present embodiment, final design of the ring for male 2 and the ring for female 3 is occurred from fusion of the design of lamination and pattern.

This invention is not limited in the embodiment mentioned above. Namely, regarding the component in the embodiment mentioned above, a person skilled in the art can do various changes, combination, sub-combination and substitution in the technical or equivalent scope of this invention.

Namely, in the embodiment mentioned above, joint of the ring 40 and the ring 42 shows in FIG. 9A are cut as explained in Step ST24, then as shown in FIG. 1, illustrate the case of manufacture that leaves the configuration of convex parts which as to cut parts.

In this invention, it can be formed by hitting until no convex parts left. In this case, the ring for male and the ring for female with no convex parts are manufactured.

In addition, for example, this invention is applicable to a ring manufacturing apparatus which operates each steps stated above by using particular hardware

INDUSTRIAL APPLICABILITY¥

This invention is applicable to the ring manufacture method by processing a metal object.

Explanations of Letters or Numerals

2—rings for male
3—rings for female
22, 24—through-hole
23, 25—Slit
The invention claimed is:
1. A ring manufacturing method comprising:
a laminating step laminating a plurality of metal plates;
a junction step jointing the plurality of metal plates by heating and giving pressure;
a twisting step heating and twisting the plurality of metal plates after the junction step;
an angle stick processing step performing rolling processing to the plurality of metal plates to make angle stick shape;
a slit formation step forming two longitudinal slits in the angle stick component;
a ring formation step opening the slits from inside thereof to make two ring components; and
a cutting step cutting and separating the two ring components into two rings.

2. The ring manufacturing method as set forth in claim 1, further comprising
a hole formation step forming through-holes nearby both end of the angle stick component,
wherein the slit formation step forms the slit from the through-hole to the center of the angle stick component.

3. The ring manufacturing method as set forth in claim 1, further comprising:
an interval determination step indicating an interval of feature pattern repeatedly occurred on the ring component; and
a time of twists determination step determining the time of the twists in the twisting step based on sum of length of round direction of the two ring component and the interval indicated in the interval determination step,
wherein the twisting step heats and twists the plurality of metal plates after the junction step so that the time of the twists determined in the time of twists determination step of reversion occurs.

4. The ring manufacturing method as set forth in claim 1
wherein the cutting step cuts and separates the two ring components into two rings so that a joint before the cutting step occurs as convex parts in the two rings after the cutting step.

5. The ring manufacturing method as set forth in claim 3
wherein the slit formation step forms the slit by rubbing the angle stick with a threadlike saw in the through-holes, and
the ring formation step inserts an iron core into the slit and swat to form the ring after opening the slit using graver.

6. The ring manufacturing method as set forth in claim 2
wherein the junction step determines a pressurize temperature based on a thermal expansion coefficient of stainless steel to achieve prescribed pressure by pressurizing the laminated plurality of metal plates from both sides by stainless steel component.

7. The ring manufacturing method as set forth in claim 6 further comprising a ground step grounding the plurality of metal plates to make uniform surface, wherein the laminating step laminates the plurality of metal plates which are grounded in the ground step.

8. The ring manufacturing method as set forth in claim 7 wherein the twisting step repeat successively twist process while heating and cooling process.

* * * * *